United States Patent
Kitani

(10) Patent No.: US 8,089,538 B2
(45) Date of Patent: Jan. 3, 2012

(54) IMAGE PROCESSING APPARATUS AND IMAGE PROCESSING METHOD FOR CORRECTING IMAGE DATA ASSOCIATED WITH A DEFECTIVE PIXEL

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 12/130,703

(22) Filed: May 30, 2008

(65) Prior Publication Data

US 2008/0297629 A1 Dec. 4, 2008

(30) Foreign Application Priority Data

May 31, 2007 (JP) ................................. 2007-145474
Apr. 14, 2008 (JP) ................................. 2008-104750

(51) Int. Cl.
*H04N 9/64* (2006.01)
*H04N 5/225* (2006.01)

(52) U.S. Cl. ...................................... 348/246; 348/220.1
(58) Field of Classification Search .......................... None
See application file for complete search history.

(56) References Cited

U.S. PATENT DOCUMENTS

| | | | | |
|---|---|---|---|---|
| 6,084,634 A * | 7/2000 | Inagaki et al. | ................. | 348/294 |
| 6,970,193 B1 * | 11/2005 | Kidono et al. | ................. | 348/245 |
| 7,301,572 B2 * | 11/2007 | Kitani | ........................... | 348/247 |
| 7,812,867 B2 * | 10/2010 | Okado | ........................... | 348/247 |
| 2004/0169737 A1 * | 9/2004 | Udagawa | .................... | 348/222.1 |
| 2005/0030412 A1 | 2/2005 | Nakayama | | |
| 2006/0050158 A1 * | 3/2006 | Irie | ............................... | 348/246 |

FOREIGN PATENT DOCUMENTS

| | | |
|---|---|---|
| EP | 1282304 A1 | 2/2003 |
| JP | 2002135793 A | 5/2002 |

* cited by examiner

*Primary Examiner* — Justin P Misleh

(57) ABSTRACT

When pixel data of a solid-state image-pickup device is read in various types of methods to pick up images, a correction process for defective pixels is easily performed at a low cost. As defect-correction data in a case in which a still image is shot, data is used, which is acquired when an image-pickup device is shipped from a manufacturing factory. In a case of an operation in a reading mode for a moving image, immediately before a reading operation is performed, charge is accumulated in a state in which the image-pickup device is shielded from light, and image data is read. Addresses of defective pixels to be corrected are detected from the image data, and stored in a RAM as the defect-correction data. When a moving image is shot, a defect-correction process is performed using the data.

12 Claims, 12 Drawing Sheets

IMAGE PROCESSING APPARATUS AND IMAGE PROCESSING METHOD FOR CORRECTING IMAGE DATA ASSOCIATED WITH A DEFECTIVE PIXEL

BACKGROUND OF THE INVENTION

1. Field of the Invention

The present invention relates to a defective-pixel-correction technology in which image signals associated with defective pixels that have occurred in a solid-state image-pickup device are corrected.

2. Description of the Related Art

In the related art, it has been known that, in a solid-state image-pickup device, such as a charge-coupled device (CCD) sensor and a complementary metal-oxide-semiconductor (CMOS) sensor, defective pixels, which output abnormal image signals, occur in the manufacturing process of the solid-state image-pickup device. It is very difficult to completely avoid the occurrence of the defective pixels in the manufacturing process of the solid-state image-pickup device. Accordingly, in the related art, a defective-pixel-correction technology has been realized, in which image signals output from defective pixels are corrected using image processing.

In a defective-pixel-correction method used in the related art, generally, signals output from defective pixels are corrected using interpolation processing in which signals output from normal pixels that are adjacent to the defective pixels and that have the same color as the defective pixels are used. In this case, when the solid-state image-pickup device is shipped from a factory, by evaluating a dark output and an exposure output under predetermined conditions, pixels having output values that fall outside a predetermined output range are determined as defective pixels. Then, data on the type of the defective pixels, such as black pixels and white pixels, address data on the defective pixels (coordinates X in the horizontal direction and Y in the vertical direction of image data), and data on output levels of the defective pixels are acquired as defect-correction data.

The defect-correction data is stored in a read-only memory (ROM) or the like, and the ROM is mounted in an image processing apparatus, such as an electronic camera. The image processing apparatus performs a defect-correction process using the defect-correction data.

Recently, because the number of pixels in the solid-state image-pickup device has increased, the solid-state image-pickup device has been capable of shooting a very fine still image. Furthermore, an electronic camera capable of displaying/recording not only a still image but also a moving image has been realized. When a moving image is displayed/recorded, in order to obtain a finer resolving power in the time direction, it is necessary to ensure a frame rate of at least approximately from 24 to 30 frames per second.

Additionally, in order to perform both a generation process, in which image data read from a large number of pixels is generated in a case in which a still image is shot, and a reading process, in which image data are read at a high frame rate in a case in which a moving image is shot, when a moving image is shot, the solid-state image-pickup device is designed so that the number of pixels from which image data output can be decreased. For example, when image data is read from all of the pixel regions of the solid-state image-pickup device at a high speed, a reading process in which image data is read from one pixel from among every predetermined number of pixels in each of the horizontal and vertical directions of the solid-state image-pickup device, i.e., a thinned-out reading process, is performed. As a result, the number of pixels from which image data is output can be decreased.

As another method for decreasing the number of pixels from which image data is output, a thinned-out pixel-addition reading process using a so-called pixel-combination unit is known. When the thinned-out reading process is simply performed, the sampling frequency is spatially reduced, resulting in an increase in noise. For this reason, in the thinned-out pixel-addition reading process, in the solid-state image-pickup device, pixel outputs to be not read are added to pixel outputs to be read to obtain added pixel outputs, and the added pixel outputs are read. As the thinned-out pixel-addition reading process, for example, a method disclosed in Japan Patent Laid-Open No. 2002-135793 has been suggested.

In addition, in particular, in a CMOS-type solid-state image-pickup device, a partially cut out reading process can also be easily performed, in which pixel data is read only from pixels disposed in a certain region of the solid-state image-pickup device.

Regarding a method for correcting defective pixels of the solid-state image-pickup device, when a reading method in which image data is read from the solid-state image-pickup device is changed, the address data on defective pixels, which is used as the above-described defect-correction data, needs to be also changed because the size of image data to be obtained is changed in accordance with the reading method.

Accordingly, suppose that, also when a moving image is read, defective pixels are to be corrected in the same manner. As the address data on the defective pixels, it is necessary to convert from address data corresponding to an image size for an all-pixel reading mode to address data corresponding to an image size for a case in which a moving image is read. Additionally, when the solid-state image-pickup device is shipped from a factory thereof, it is necessary to acquire several types of defect-correction data in advance for a case in which a moving image is read, and to store all of the data in a camera. In accordance with a reading method of the solid-state image-pickup device, it is necessary to switch defect-correction data that is to be applied among the several types of defect-correction data. Alternatively, it is necessary to extract defect-correction data for a case in which a moving image is read when a camera is assembled, and to write the defect-correction data into the camera.

Furthermore, there are the following problems. For example, in a case in which an address-conversion method is switched in accordance with a reading method of the solid-state image-pickup device, the size of memory used in a camera system is equal to that of the ROM used in a case in which a still image is shot. However, address re-conversion is performed for each reading method using firmware of the camera, the load of a conversion process is heavy. Accordingly, because plenty of time is necessary to perform the conversion process, it is very difficult to finish the conversion process in a realistically short time.

In particular, in defect-correction data that can be used in an all-pixel-reading process for a still image, information concerning defective pixels having very low levels is described in order to support a high international organization for standardization (ISO) speed rating and a long-time exposure. The data size of the defect-correction data is significantly large.

In contrast, regarding a reading process for a moving image, even when an ISO speed rating that is used is the same as that used in a reading process for a still image, it is not necessary to consider a long-time exposure because the maximum exposure time is defined on the basis of the frame rate. The size of defect-correction data that is generated for a moving image is smaller than that of defect-correction data for a still image. However, even when the defect-correction data for a moving image, the size of which is small, is to be generated, it is necessary to search defective pixels to be corrected in the defect-correction data for a still image, the size of which is significantly larger, and to perform an address conversion. For this reason, the process load is markedly increased.

In a case in which a thinned-out pixel-addition reading process is performed, when not only pixels to be read but also peripheral pixels to be added are defective pixels, the defective pixels influence the address conversion. Accordingly, the performance of the address conversion needs more complicated processing.

Suppose that all types of defect-correction data that can be used in reading methods of the solid-state image-pickup device are to be stored. The size of defect-correction data for a moving image is small. However, it is necessary to prepare defect-correction data for each reading method. More specifically, when a cut-out reading process is supported, it is necessary to prepare defect-correction data for each reading position for each cutting-out ratio. Accordingly, the number of the types of data to be saved is increased, and, in the camera system, the size of the used area of the ROM, in which the defect-correction data is saved, is significantly large. The load necessary for the management is also increased.

For example, suppose that 1/5 of image data is cut out and read in each of the horizontal and vertical directions. Even when reading-start positions and reading-end positions are limited to five positions in the image data in each of both the horizontal and vertical directions, 25 (=5×5) different reading positions can be selected. Because it is necessary to prepare defect-correction data for each of the reading positions, even in this case, the number of types of defect-correction data is 25.

When these data are generated in a manufacturing process of the camera, it is necessary to acquire each of the data for a corresponding reading method. Thus, various factors responsible for the increase in cost, for example, one of which is the increase in test time in the manufacturing process, occur.

In view of the circumstances described above, when pixel data of the solid-state image-pickup device is read in various types of methods to pick up images, the defect-correction process for defective pixels is desirably performed easily at a low cost.

SUMMARY OF THE INVENTION

The present invention provides an image processing apparatus and an image processing method.

According to an aspect of the present invention, an image processing apparatus is provided, which includes a storage medium in which first correction data is stored in advance, a generator circuit arranged to generate second correction data using image data that is read from an image-pickup device in which charge accumulation is performed in a state in which the image-pickup device is shielded from light, a first correction circuit arranged to correct image data associated with a defective pixel of the image-pickup device on the basis of the first correction data, a second correction circuit arranged to correct image data associated with a defective pixel of the image-pickup device on the basis of the second correction data, and a control circuit operable to select either the first correction circuit or the second correction circuit for correcting image data associated with a defective pixel of the image-pickup device based on the number of pixels in image data read from the image-pickup device.

According to another aspect of the present invention, an image processing apparatus is provided, which includes a storage medium in which first correction data is stored in advance, a generator circuit arranged to generate second correction data using image data that is read from an image-pickup device in which charge accumulation is performed in a state in which the image-pickup device is shielded from light, a first correction circuit arranged to correct image data associated with a defective pixel of the image-pickup device on the basis of the first correction data, a second correction circuit arranged to correct image data associated with a defective pixel of the image-pickup device on the basis of the second correction data, and a control circuit arranged to select the first correction circuit or the second correction circuit for correcting image data associated with a defective pixel of the image-pickup device on the basis of whether image data read from the image-pickup device corresponds to a moving image or a still image.

According to another aspect of the present invention, an image processing method for correcting image data read from a defective pixel of an image-pickup device is provided. The image processing method includes the followings: determining the number of pixels in the image data read from the image-pickup device; selecting either a first defective pixel correcting step using first correction data or a second defective pixel correcting step using second correction data, based on the number of pixels in the image data read from the image-pickup device, the first correction data having been stored in advance and the second correction data being derived from image data that is read from the image-pickup device in which charge accumulation is performed in a state in which the image-pickup device is shielded from light; and carrying out the selected defective pixel correcting step so as to correct the image data associated with a defective pixel of an image-pickup device.

According to another aspect of the present invention, an image processing method for correcting image data read from a defective pixel of an image-pickup device is provided. The image processing method includes the followings: determining whether image data read from the image-pickup device relates to a moving image or a still image; selecting either a first defective pixel correction step using first correction data stored in advance or a second defective pixel correcting step using second correction data generated using image data that is read from the image-pickup device in which charge accumulation is performed in a state in which the image-pickup device is shielded from light; and carrying out the selected defective pixel correcting step so as to correct image data associated with a defective pixel of the image-pickup device.

Further features of the present invention will become apparent from the following description of exemplary embodiments with reference to the attached drawings.

DESCRIPTION OF THE EMBODIMENTS

Figure 1:
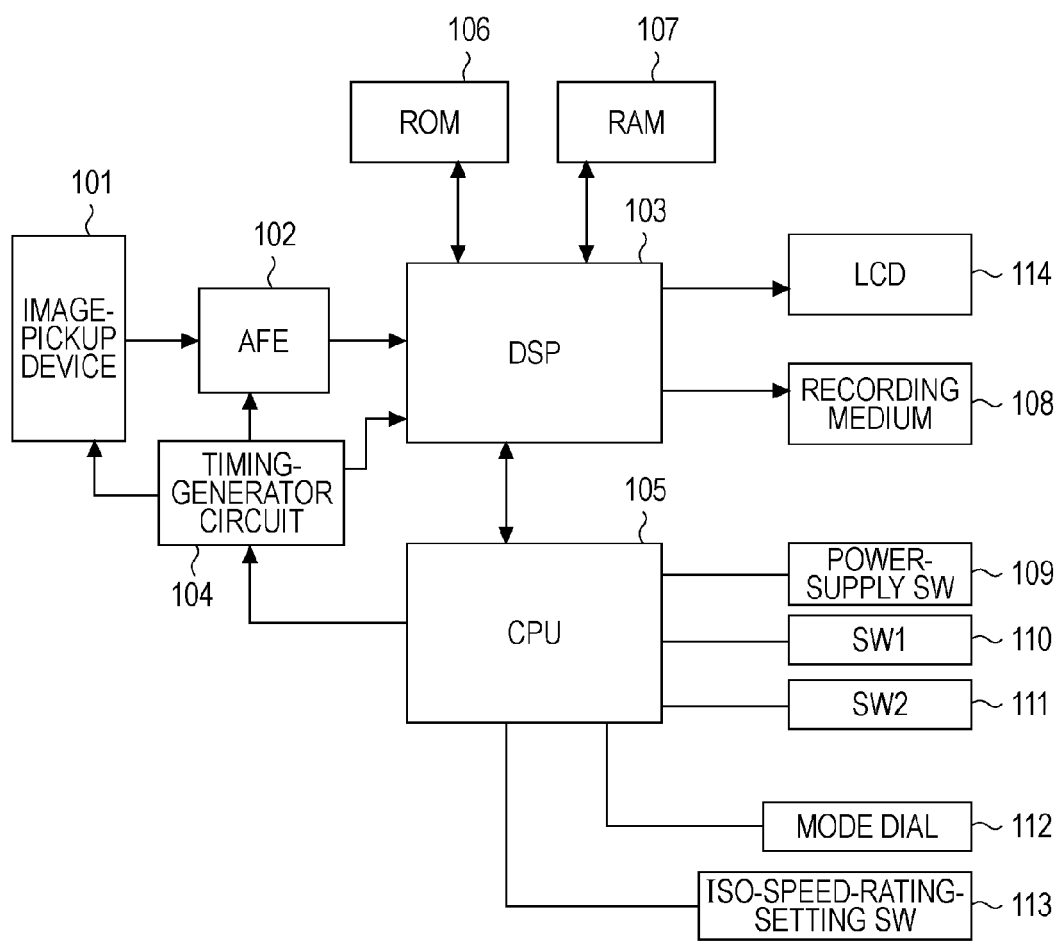
FIG. 1 is a schematic block diagram of a configuration of an image processing apparatus (an image-pickup apparatus) according to an embodiment of the present invention.

Exemplary embodiments of the present invention will now be described with reference to the accompanying drawings. FIG. 1 is a schematic block diagram of a configuration of an image-pickup apparatus that is an image processing apparatus according to an embodiment of the present invention.

The image-pickup apparatus includes an image-pickup device 101, an analog front end (AFE) 102, a digital signal processor (DSP) 103, a timing-generator circuit 104, and a central processing unit (CPU) 105.

As the image-pickup device 101, for example, a CMOS sensor (a solid-state image-pickup device) is used.

The CMOS sensor includes an amplifier circuit (not shown) that is capable of switching gains on the basis of ISO speed ratings. Image data including an image that is picked up by the CMOS sensor can be read in an all-pixel reading mode (in a first operation mode), in which image data is read from all pixels, a thinned-out reading mode (in a second operation mode), in which image data is read from thinned-out pixels, and a partially cut out reading mode (in the second operation mode), in which a reading-start position and a reading-end position are selected in each of the horizontal and vertical directions and image data is read from pixels determined using the positions. Furthermore, in the thinned-out reading mode, image data can be read in a thinned-out pixel-addition reading mode, in which outputs of a plurality of pixels disposed in the CMOS sensor are added, averaged and output.

Figure 8:
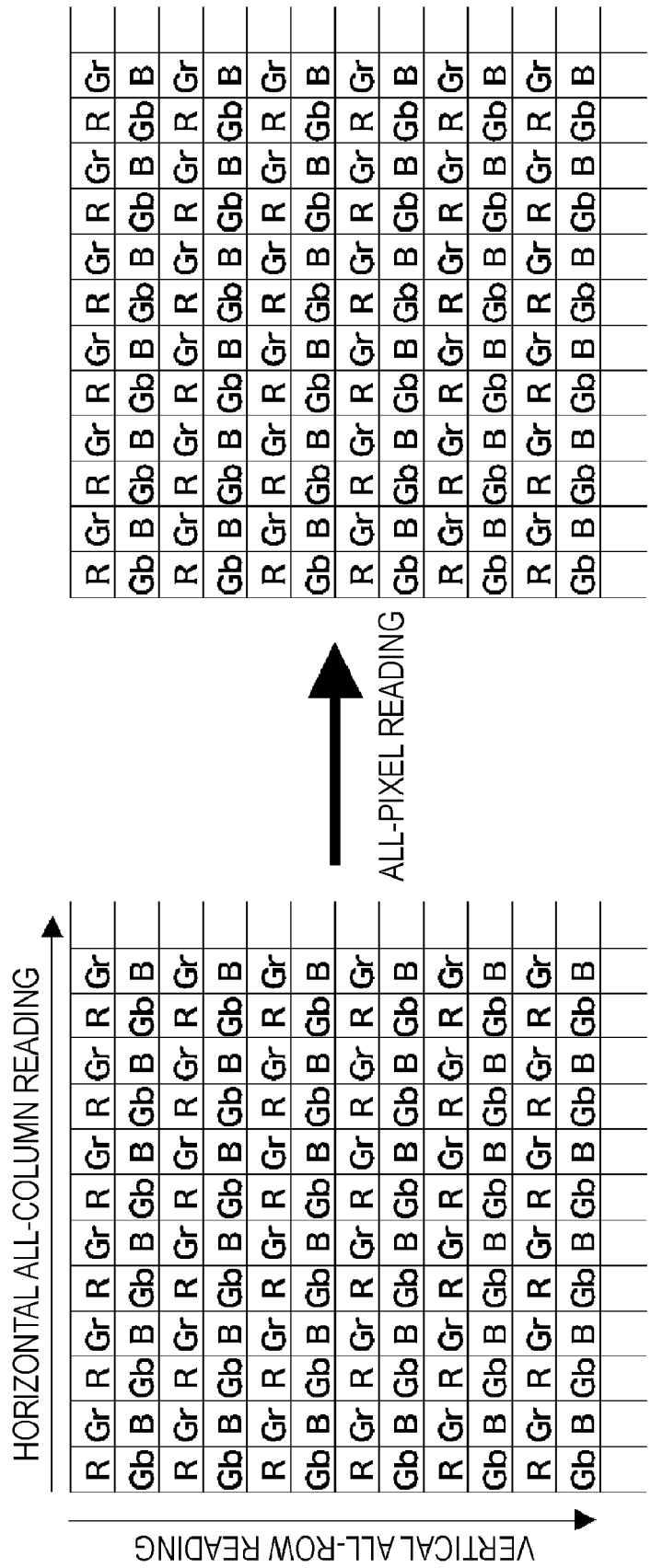
FIG. 8 is an illustration of an all-pixel reading process (in a case in which a still image is shot).

FIG. 8 illustrates a normal all-pixel reading process. On the left side in FIG. 8, the physical disposition of pixels of the image-pickup device 101 is illustrated. Symbols, "R", "Gr", "Gb", and "B", each of which is illustrated in a corresponding pixel region, represent a primary-color Bayer pattern. When the pixels of the image-pickup device 101 are sequentially scanned in the horizontal and vertical directions, the outputs of all of the pixels can be obtained as a time series. Image data as the time series is illustrated on the right side in FIG. 8. In this case, since all of the pixels are read, the image data to be obtained reasonably has a pattern of pixels (colors) similar to the physical disposition of the pixels.

The AFE 102 includes an analog-to-digital (A/D) converter that coverts an analog signal, which is output from the image-pickup device 101, into a digital signal, and also has a function of clamping a dark offset level. The DSP 103 processes data output from the AFE 102 using various types of correction processes, a development process, and a compression process. Additionally, the DSP 103 performs an accessing process in which various types of memories, such as a read-only memory (ROM) 106 and a random-access memory (RAM) 107, are accessed, a writing process in which image data is written into a recording medium 108, a displaying process in which various types of data are displayed on a liquid crystal display (LCD) 114, and so forth.

Figure 5:
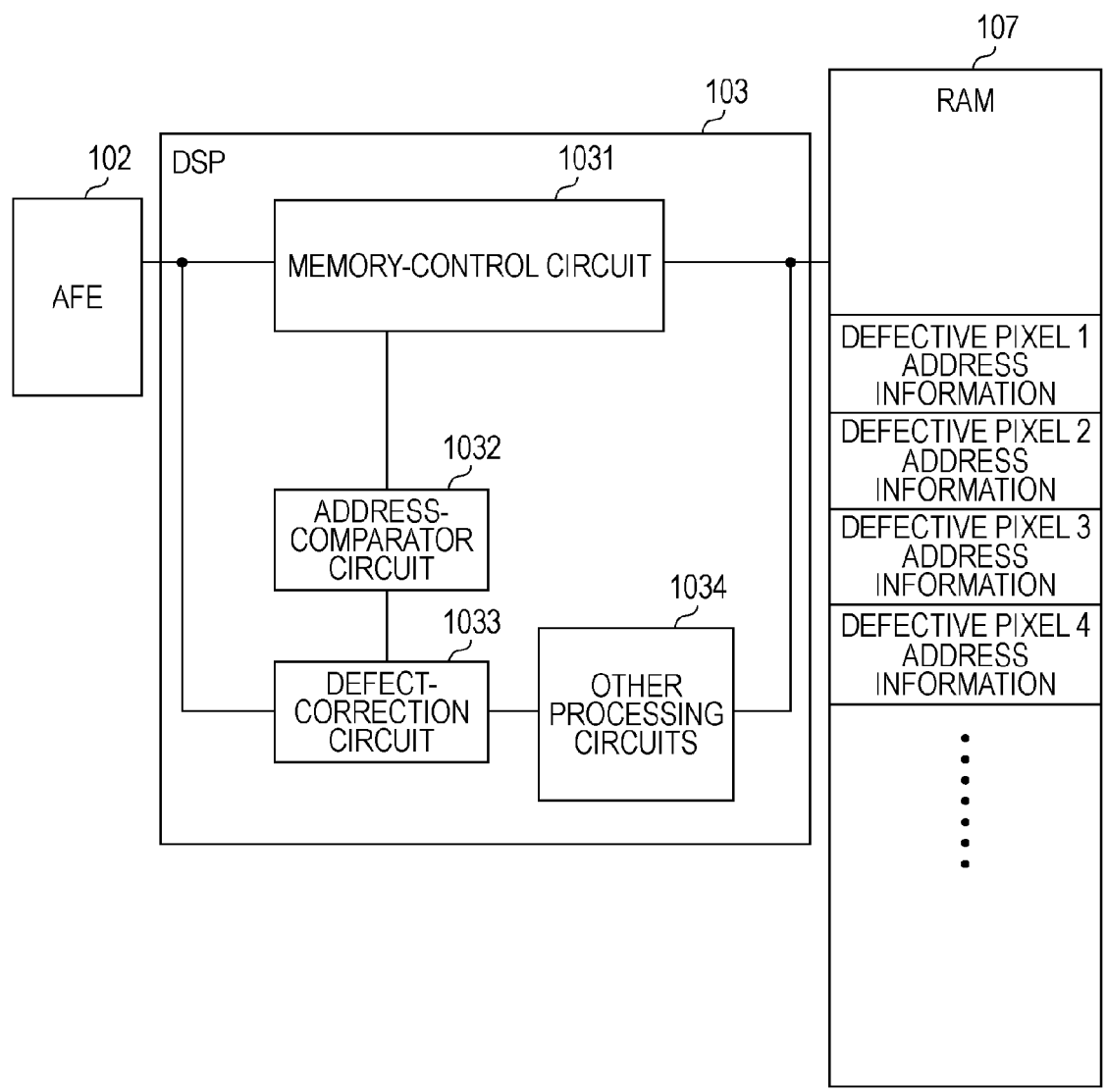
FIG. 5 is a block diagram of a defect-correction circuit of the image-pickup apparatus.

The DSP 103 includes a defect-correction circuit 1033 (see FIG. 5). In other words, the DSP 103 has a defective-pixel-correction function of correcting output data that is output from defective pixels using output data that is output from other pixels. In the ROM 106, defect-correction data used in a still-image-shooting mode (first correction data) is stored, which is generated when the image-pickup apparatus or the image-pickup device 101 is manufactured.

The timing-generator circuit 104 is controlled by the CPU 105 so as to supply clock signals and control signals to the image-pickup device 101, the AFE 102, and the DSP 103. The timing-generator circuit 104 and the DSP 103 operate together to generate timing signals corresponding to various types of reading modes of the CMOS sensor.

The CPU 105 controls the DSP 103, the timing-generator circuit 104, and camera functions in which a photometric control unit (not shown) and a ranging-control unit (not shown) and so forth are used. To the CPU 105, for example, a power-supply switch 109, a first-stage shutter switch SW1 (110), a second-stage shutter switch SW2 (111), a mode dial 112, and an ISO-speed-rating-setting switch 113 are connected. The CPU 105 performs processing on the basis of the settings of the switches and the dial.

The ROM 106 stores a control program for controlling the image-pickup apparatus, i.e., a program that is executed by the CPU 105 in accordance with processes shown in FIGS. 2, 3, 4, 6, and 7, and various types of correction data (including the defect-correction data), and so forth. The ROM 106 is configured, generally, using a flash memory. The RAM 107 is configured so as to be accessed by the CPU 105 at a higher speed than in the case of the ROM 106. The RAM 107 is used as a work area, and temporarily stores image data to be processed by the DSP 103, or the like. The defect-correction data, which is stored in the ROM 106, is loaded into the RAM 107 to be used when an image is shot.

As the recording medium 108, for example, a memory card, which is capable of saving image data including a picked-up image, or the like can be used. The recording medium 108 is connected, for example, through a connector (not shown) to the DSP 103. The power-supply switch 109 is controlled by a user to activate the image-pickup apparatus. When the first-stage shutter switch SW1 is turned on, a pre-image-shooting process, such as a photometric process and a ranging process, is performed. When the second-stage shutter switch SW2 is turned on, a series of image-pickup operations is started, in which a mirror (not shown) and a shutter (not shown) are driven, and in which image data including an image picked up by the image-pickup device 101 is written into the recording medium 108 via the AFE 102 and the DSP 103.

The mode dial 112 is used to set various types of operation modes of the image-pickup apparatus. The ISO-speed-rating-setting switch 113 is used to set an ISO speed rating of the image-pickup apparatus for shooting an image. The LCD 114 displays camera information. Additionally, the LCD 114 reproduces and displays a shot image, or displays moving-image data.

Next, an outline of an image-shooting operation of the image-pickup apparatus shown in FIG. 1 will be described on the basis of a flowchart shown in FIG. 2.

When the power-supply switch 109 is turned on (step S201), the CPU 105 determines whether or not electric energy necessary for shooting an image remains in a battery (step S202). As a result, when no electric energy necessary for shooting an image remains in the battery (NO in step S202), the CPU 105 displays a warning message saying so on the LCD 114 (step S211). Then, the CPU 105 returns to step S201, and waits until the power-supply switch 109 is turned on again.

When electric energy necessary for shooting an image remains in the battery (YES in step S202), the CPU 105 checks the recording medium 108 (step S203). More specifically, the CPU 105 checks whether or not the recording medium 108 capable of recording data the size of which is equal to or more than a predetermined size is mounted in the image-pickup apparatus. When the recording medium 108 capable of recording data the size of which is equal to or more than a predetermined size is not mounted in the image-pickup apparatus, the CPU 105 displays a warning message saying so on the LCD 114 (step S211). Then, the CPU 105 returns to step S201.

When the recording medium 108 capable of recording data the size of which is equal to or more than a predetermined size is mounted in the image-pickup apparatus, the CPU 105 determines whether or not the image-shooting mode set using the mode dial 112 is a still-image-shooting mode or any one of moving-image shooting modes (step S204). When the still-image-shooting mode is set, the CPU 105 performs a still-image-shooting process (step S205). When one of the moving-image shooting modes is set, the CPU 105 performs a moving-image shooting process (step S206).

Next, the details of the still-image-shooting process of step S205 shown in FIG. 2 will be described on the basis of a flowchart shown in FIG. 3.

In the still-image-shooting process, first, the CPU 105 waits until the shutter switch SW1 is turned on (step S301). Then, when the shutter switch SW1 is turned on, the CPU 105 performs the photometric process, in which an aperture value and a shutter speed are determined, and the ranging process, in which an image-shooting lens is adjusted so as to be focused on an object, using the photometric control unit (not shown) and the ranging-control unit (not shown), respectively (step S302).

Next, the CPU 105 determines whether or not the shutter switch SW2 is turned on (step S303). As a result, when the shutter switch SW2 is not turned on, the CPU 105 determines whether or not a state in which the shutter switch SW1 is turned on continues (step S304).

When a state in which the shutter switch SW1 is turned on continues, the CPU 105 returns to step S303, and determines whether or not the shutter switch SW2 is turned on. In contrast, when a state in which the shutter switch SW1 is turned on does not continue, the CPU 105 returns to step S301, and waits until the shutter switch SW1 is turned on again.

In step S303, when it is determined that the shutter switch SW2 is turned on, the CPU 105 performs an image-shooting process (step S305). The details of the image-shooting process will be described below.

Next, the CPU 105 controls the DSP 103 so that the DSP 103 can perform a development process in which shot-image data is developed (step S306). Then, the CPU 105 controls the DSP 103 so that the DSP 103 can perform a compression process in which image data that has been subjected to the development process is compressed, and in which image data that has been subjected to the compression process is stored in a free area of the RAM 107 (step S307).

Then, the CPU 105 controls the DSP 103 so that the DSP 103 can read the image data stored in the RAM 107, and so that the DSP 103 can perform a recording process in which the image data is record in the recording medium 108 (step S308). The CPU 105 checks whether the power-supply switch 109 is turned on or off (step S309). When the power-supply switch 109 is still turned on, the CPU 105 returns to step S301, and prepares for the next image to be shot. In contrast, when the power-supply switch 109 is turned off, the CPU 105 returns to step S201 shown in FIG. 2, and waits until the power-supply switch 109 is turned on again.

Next, the details of the image-shooting process of step S305 shown in FIG. 3 will be described on the basis of a flowchart shown in FIG. 4.

In the image-shooting process, the CPU 105 sets the gain of an amplifier included in the image-pickup device 101, the gain of a circuit included in the AFE 102, and so forth so that the ISO speed rating of the image-pickup apparatus for shooting an image can be equalized to an ISO speed rating set using the ISO-speed-rating-setting switch 113 (step S400).

Then, the CPU 105 selects the defect-correction data (step S401). In this embodiment, the type of defective pixels to be corrected is limited to white defects. The white defects have a characteristic that the levels of the white defects are increased in accordance with an exposure time (a charge-accumulation time). Additionally, in a case in which two white defects with the same level are compared with each other, when one of the two white defects is displayed using a high ISO speed rating that has been set, the white defect is recognized as a defect larger than the other white defect in an image. For this reason, in this embodiment, as a determination value used to determine whether pixels disposed in the image-pickup device 101 are defective pixels to be corrected, a determination value is used, which is set such that the higher the ISO speed rating, i.e., the longer the shutter time, the smaller the maximum level of the defective pixels that can be corrected.

Figure 3:
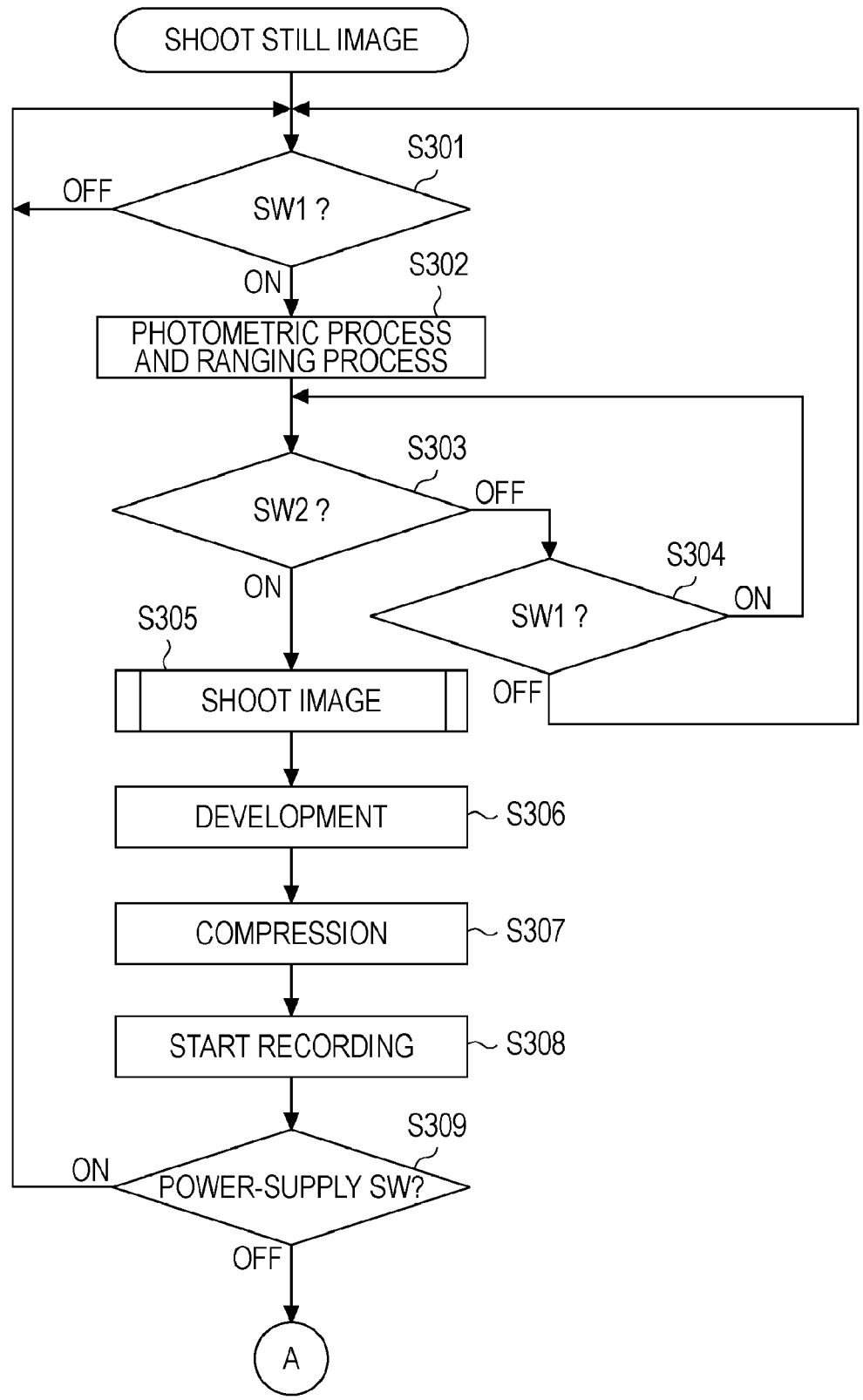
FIG. 3 is a flowchart showing the details of a still-image shooting process of step S205 shown in FIG. 2.
Figure 4:
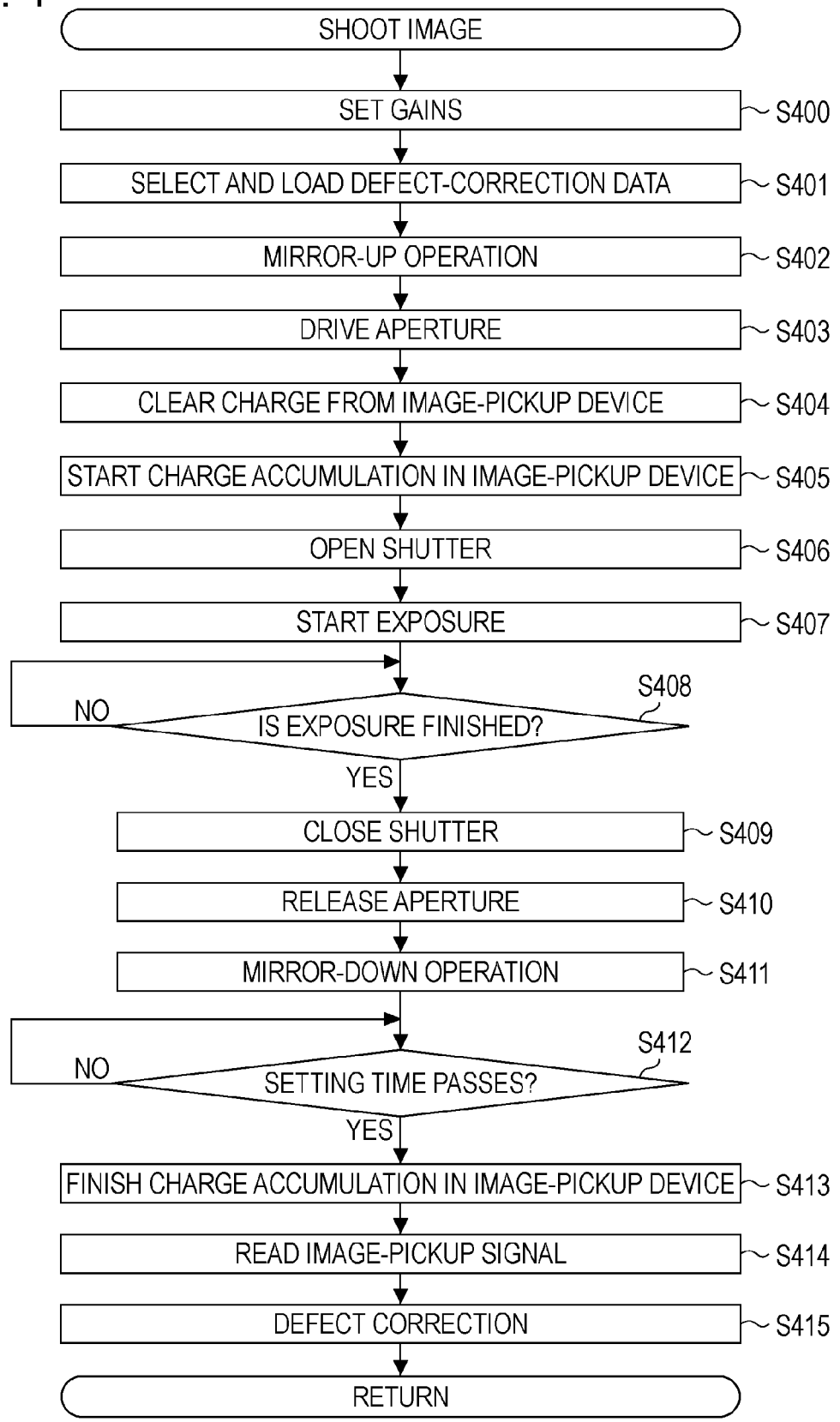
FIG. 4 is a flowchart showing the details of an image-shooting process of step S305 shown in FIG. 3.

In other words, in step S401, the CPU 105 determines the determination value for defective pixels on the basis of the ISO speed rating, which has been set using the ISO-speed-rating-setting switch 113, and the shutter speed, which has been determined in step S302 shown in FIG. 3. The CPU 105 compares the determination value with level values that are described in the defect-correction data stored in the ROM 106. Then, the CPU 105 selects only pixels whose levels are higher than the determination value from among the defective pixels described in the defect-correction data as defective pixels to be corrected. The CPU 105 loads the defect-correction data associated with the defective pixels to be corrected into the RAM 107. In this case, the defect-correction data includes only address information concerning the defective pixels to be corrected.

Next, the CPU 105 moves the mirror into a mirror-up position (step S402). The CPU 105 drives the aperture until when the aperture has a predetermined aperture value on the basis of photometric data, which has been acquired in the photometric process of step S302 shown in FIG. 3 (step S403). The CPU 105 deletes (clears) charge from the image-pickup device 101 (step S404). The CPU 105 starts charge accumulation in the image-pickup device 101 (step S405). The CPU 105 opens the shutter (step S406), and starts exposing the image-pickup device 101 to light (step S407).

The CPU 105 waits until an exposure-end time defined by the photometric data elapses (step S408). When the exposure-end time has elapsed, the CPU 105 closes the shutter (step S409). Next, the CPU 105 drives the aperture until when the aperture has an aperture value for releasing the aperture (step S410). The CPU 105 drives the mirror into a mirror-down position (step S411). After that, the CPU 105 waits until the charge-accumulation time that has been set elapses (step S412). When the charge-accumulation time has elapsed, the CPU 105 finishes the charge accumulation in the image-pickup device 101 (step S413).

Then, the CPU 105 reads a signal from the image-pickup device 101 (step S414). In this case, the AFE 102, which has the function of clamping a dark offset level, performs a clamp operation using an output from an optical black unit (not shown) of the image-pickup device 101.

Next, the CPU 105 performs a defect-correction process (step S415) (a first correction process). The defect-correction process is performed using the defect-correction circuit 1033 shown in FIG. 5. In other words, as shown in FIG. 5, the DSP 103 includes the defect-correction circuit 1033. The defect-correction circuit 1033 replaces data read from each of the defective pixels, which is input from the AFE 102, with data read from an immediately preceding pixel having the same color.

The defect-correction process will be described in detail with reference to FIG. 5. As described above, the address information concerning only the defective pixels to be corrected in a case in which a still image is shot has already been loaded into the RAM 107 in step S401. The defect-correction circuit 1033 included in the DSP 103 performs the defect-correction process for each of the defective pixels on the basis of the address information concerning the defective pixels in the RAM 107.

For each of the defective pixels, the address information is converted and described as timing data showing a timing at which a signal corresponding to the defective pixel appears using a synchronization signal as a reference signal. A memory-control circuit 1031 transfers the timing data, which describes the address information concerning the defective pixel, to an address-comparator circuit 1032.

The address-comparator circuit 1032 compares the time at which data is read from a pixel of the image-pickup device 101 with the time shown in the timing data describing the address information, using a synchronization signal as a reference signal. When the time at which data is read from a pixel of the image-pickup device 101 coincides with the time shown in the timing data, the defect-correction circuit 1033 replaces pixel data read from the pixel with pixel data read from an immediately preceding pixel having the same color to obtain replaced pixel data, and outputs the replaced pixel data.

Then, in order to prepare the defect-correction process for the next defective pixel, the memory-control circuit 1031 immediately transfers the timing data describing the address information concerning the next defective pixel to the address-comparator circuit 1032. In the same manner, the defect-correction process is performed by the defect-correction circuit 1033 to correct pixel data read from the defective pixels.

Image data that has been subjected to the defect-correction process is subjected to various types of processes, such as a development process of step S306, a compression process of step S307, and a recording process of step S308 that are shown in FIG. 3, in other processing circuits 1034 included in the DSP 103.

Next, the moving-image shooting process will be described. In this embodiment, when the moving-image shooting mode is set, the image-pickup apparatus is designed such that the mirror (not shown) is moved to the mirror-up position, such that the shutter is opened, and such that a monitor operation is performed in which image data read from the image-pickup device 101 continues being developed and displayed on the LCD 114. As long as the shutter switch SW2 is turned on, the image-pickup apparatus is designed such that moving-image data continues being recorded in the recording medium 108.

In order that the image-pickup apparatus leaves the moving-image shooting mode, the setting of the mode dial 112 is to be changed, or the power-supply switch 109 is to be turned off. Furthermore, the size, the position, the frame rate, and so forth of a moving image to be recorded, can be set using another setting unit (not shown). In accordance with the difference in the size, the position, the frame rate, and so forth of a moving image, in this embodiment, the following moving-image shooting modes are designed.

Normal Moving-Image Mode

Figure 9:
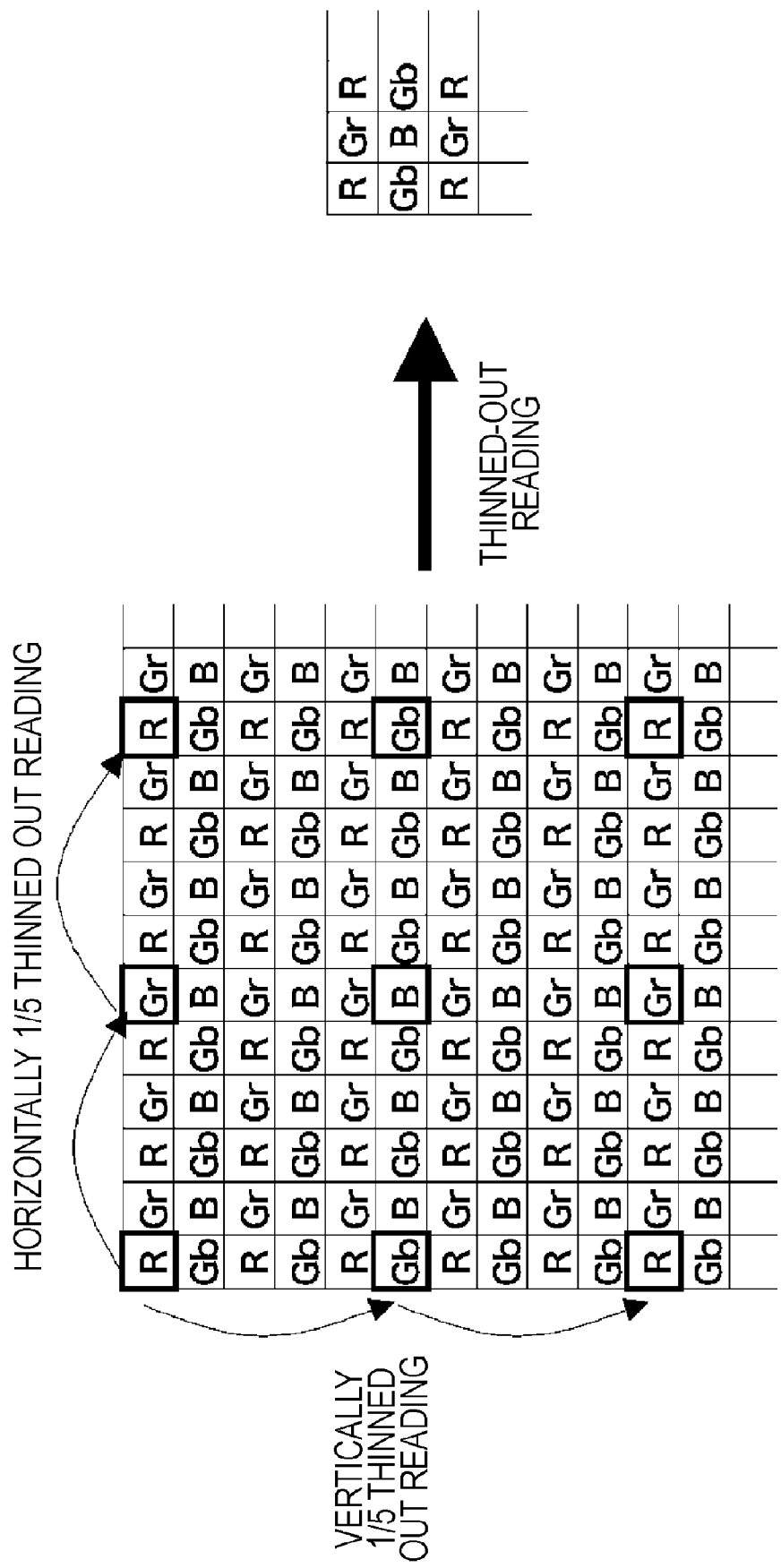
FIG. 9 is an illustration of a thinned-out reading process (in a case in which a moving image is shot).

A normal moving-image mode is a mode in which pixel data is read from only one pixel from among every five pixels disposed in the image-pickup device 101 in the horizontal and vertical directions. In other words, as shown in FIG. 9, the normal moving-image mode is a moving-image shooting mode in which a 1/5 thinned-out reading process is performed. In this case, because the number of pixels to be read is 1/25, a reading-time can be significantly reduced.

High-Speed Moving-Image Mode

Figure 10:
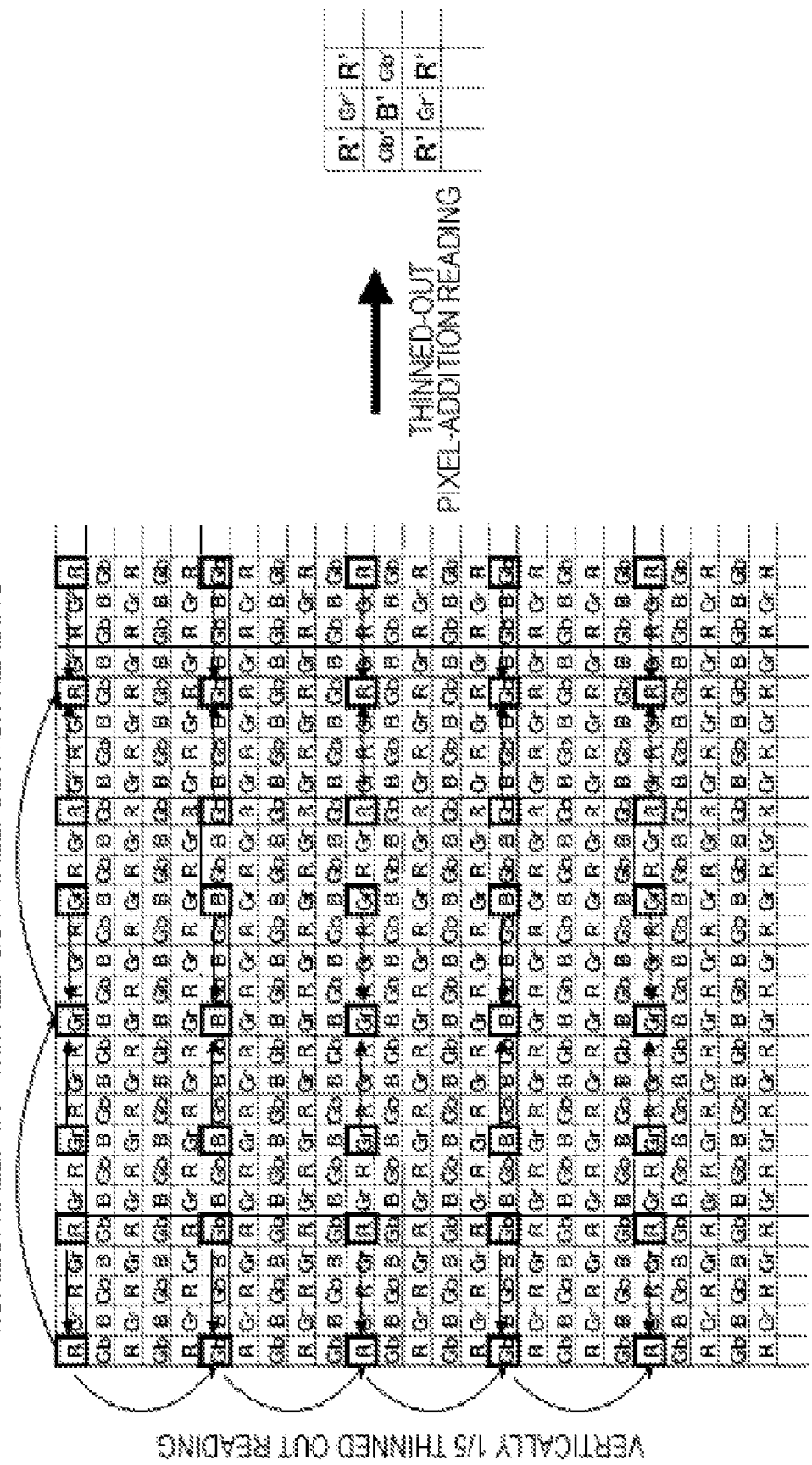
FIG. 10 is an illustration of a thinned-out pixel-addition reading process (in a case in which a moving image is shot).

In the high-speed moving-image mode, pixel data is read from only one pixel from among every eleven pixels disposed in the image-pickup device 101 in the horizontal direction, and read from only one pixel from among every five pixels in the vertical direction. Additionally, in the horizontal direction, pixel data read from each pixel is added to pixel data read from pixels each situated four pixels apart from the pixel and having the same color to obtain an added-pixel-data value. The added-pixel-data value is averaged to obtain an added-and-averaged-pixel-data value, and the added-and-averaged-pixel-data value is output as pixel data (see FIG. 10). When signals are sampled using space sampling, signals have aliasing components because the thinning-out ratio is high. However, by outputting the added-and-averaged pixel value as pixel data, the aliasing components of signals can be removed. In other words, in the high-speed moving-image mode, a thinned-out pixel-addition reading process shown in FIG. 10 is performed. In this case, because the reading-time can be significantly reduced, the number of frames per unit time is increased. Thus, the high-speed moving-image mode is a moving-image shooting mode suitable for an object moving at a high speed.

In this embodiment, in order to perform the above-described thinned-out pixel-addition reading process, the image-pickup device 101 includes a combination unit in which analog signals representing the pixel data are combined. Before a pixel-data reading process is performed, a combination process is performed in which pixel data read from each pixel is combined with pixel data read from pixels that are four pixels apart from the pixel and that have the same color in the horizontal direction. By using the combination process, pixel data to be read has an average value obtained by averaging pixel data read from each pixel and pixel data read from peripheral pixels. The pixel data obtained using the combination process is read in the same method as used in the thinned-out reading process shown in FIG. 9. The thinning-out ratio is set so as to be decreased from 1/5 to 1/11.

In an image-pickup device in which pixel data can be combined using the combination process not only in the horizontal direction but also in the vertical direction, pixel data is combined using the combination process also in the vertical direction. Thus, the aliasing components of signals sampled using the space sampling can be removed in both the horizontal and vertical directions.

Electronic-Zoom Mode

Figure 11:
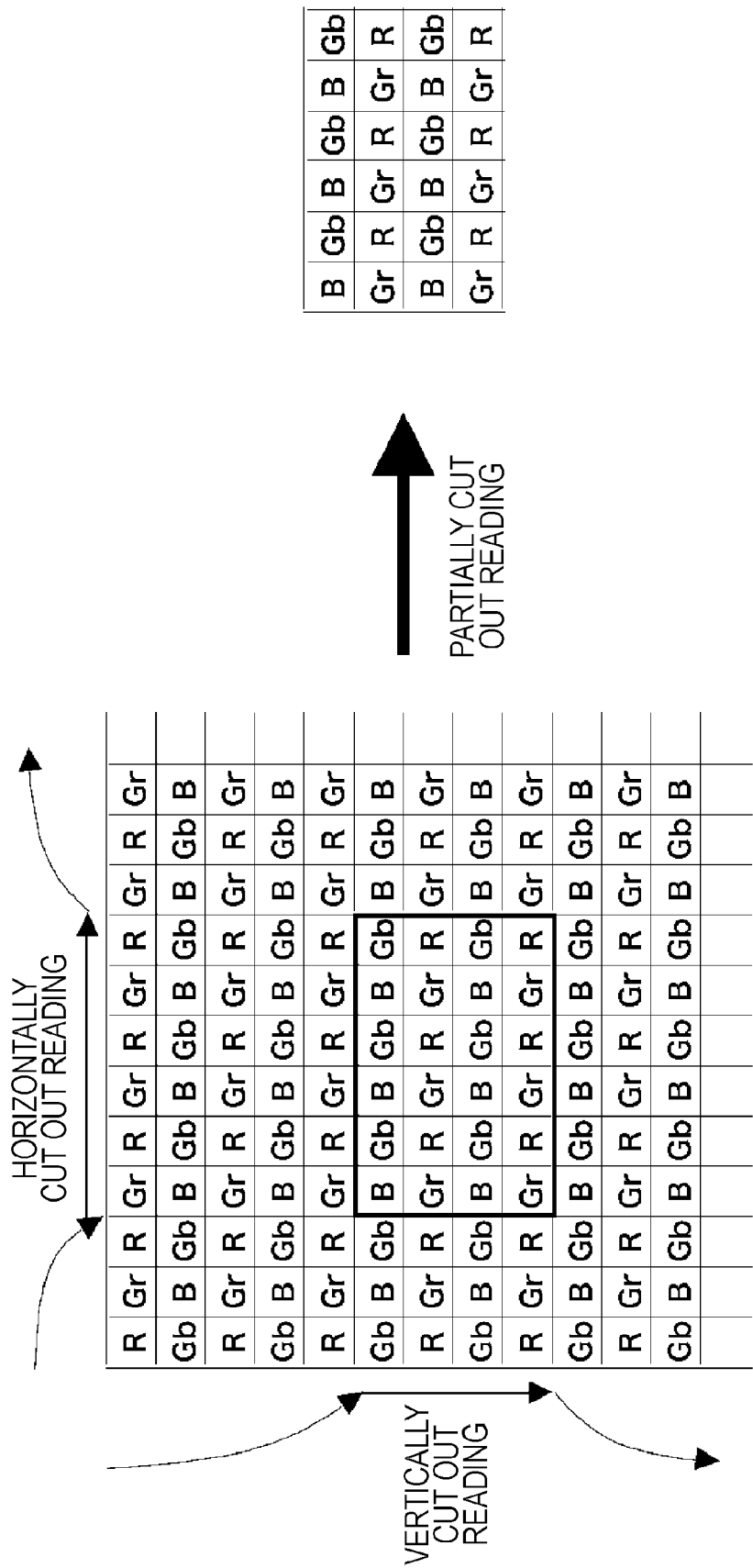
FIG. 11 is an illustration of a partially cut out reading process (in an electronic-zoom mode).
Figure 12:
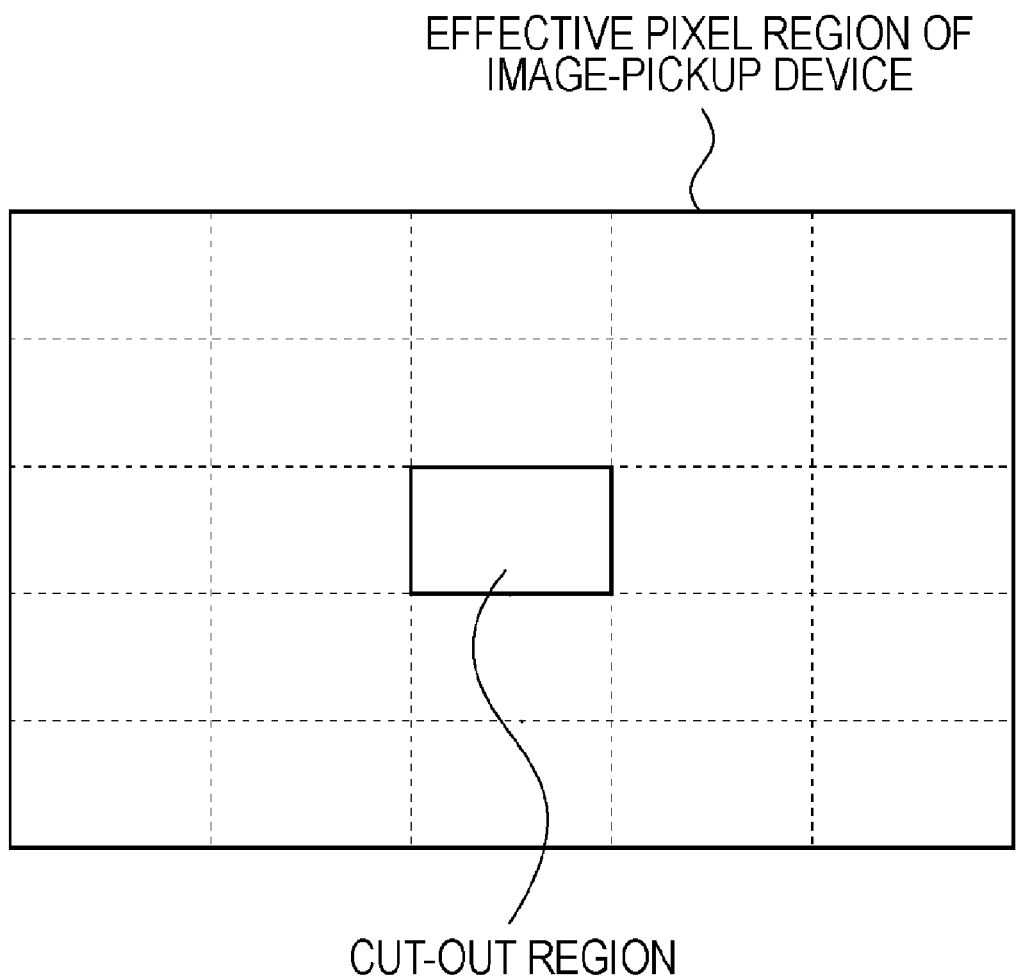
FIG. 12 is an illustration of a region that is partially cut out and read (in the electronic-zoom mode).

Because, in an electronic-zoom mode, only a certain region of the image-pickup device 101 is enlarged and displayed, the electronic-zoom mode is a mode in which pixel data is read only from a certain region of the image-pickup device 101 without being thinned out. In this embodiment, as shown in FIG. 12, 1/5 of a region containing the effective number of pixels is cut out in both the horizontal and vertical directions. In other words, in the electronic-zoom mode, a partially cut out reading process is performed, in which a region smaller than the whole frame is selectively read. FIG. 11 is an illustration of the partially cut out reading process.

In order to perform the partially cut out reading process shown in FIG. 11, in this embodiment, a reading-start position and a reading-end position can be set in each of the horizontal and vertical directions of the image-pickup device 101. On the basis of a driving signal output from the timing-generator circuit 104, pixel data can be read from all of the pixels disposed in a region determined using the reading-start position and the reading-end position without being thinned out.

In this embodiment, the image-pickup device 101 is a CMOS-type image-pickup device. Accordingly, a process in which a reading method is switched among various types of reading methods corresponding to the above-described reading processes can be easily performed by changing shift operations of shift registers in the horizontal and vertical directions.

Next, the details of the moving-image shooting process of step S206 shown in FIG. 2 will be described on the basis of a flowchart shown in FIG. 6.

The CPU 105 sets a moving-image shooting mode selected using the mode dial 112, i.e., any one of the normal moving-image mode, the high-speed moving-image mode, and the electronic-zoom mode (step S600). Next, the CPU 105 acquires defect-correction data for a moving image (second correction data) (step S601). The description of the flowchart shown in FIG. 6 is suspended, and the details of a process in which the defect-correction data for a moving image is acquired will be described on the basis of a flowchart shown in FIG. 7.

First, the CPU 105 sets the gain of an amplifier included in the image-pickup device 101, the gain of a circuit included in the AFE 102, and so forth so that the highest ISO speed rating from among assignable ISO speed ratings can be set using the ISO-speed-rating-setting switch 113 (step S700). The gains that have been set are gains used to detect defective pixels, and are set to be higher than those to be used when a moving image is shot. With the gains, the defective pixels can be detected with a higher accuracy.

Next, in order to perform a defect-correction process without using the defect-correction data stored in the ROM 106, the CPU 105 disables the operation of the defect-correction circuit 1033 included in the DSP 103 (step S701). Then, the CPU 105 clears charge from the image-pickup device 101 (step S702), and starts charge accumulation in the image-pickup device 101 (step S703). At the time of the charge accumulation, either the mirror (not shown) has not been moved into the mirror-up position, or the shutter (not shown) has not been opened. Accordingly, no object image enters the image-pickup device 101, and only a dark image can be shot.

Next, the CPU 105 determines whether the charge-accumulation time that has been set has elapsed or not (step S704). When the charge-accumulation time that has been set has elapsed, the CPU 105 finishes the charge accumulation in the image-pickup device 101 (step S705). As the charge-accumulation time to be set, basically, a time corresponding to a frame rate of a moving image to be recorded or displayed can be used. For example, in a case of a moving image having a frame speed of 30 frames per second, approximately 33 ms can be set as the charge-accumulation time. As in the case in which the gains are set in step S700, the charge-accumulation time to be set for the dark image capture may be longer than the charge-accumulation time to be used when a moving image is shot. In this case, because the output levels of white-defective pixels become large in proportion to the charge-accumulation time, white defects having more subtle levels can be detected, and the detection can be performed with a higher accuracy.

After that, the CPU 105 reads the dark image that has been obtained in the image-pickup device 101 (step S706).

Figure 6:
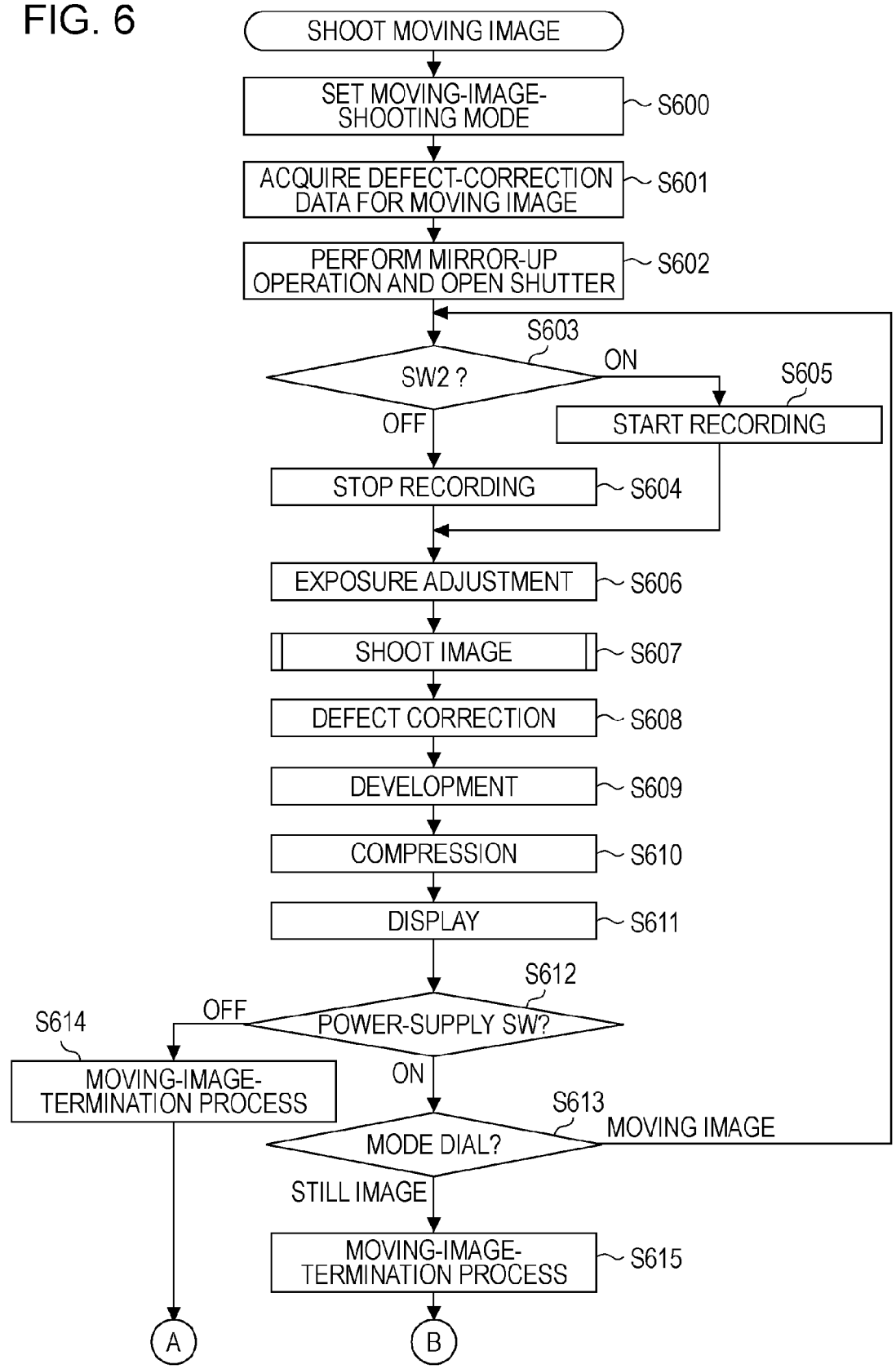
FIG. 6 is a flowchart showing the details of a moving-image shooting process of step S206 shown in FIG. 2.
Figure 7:
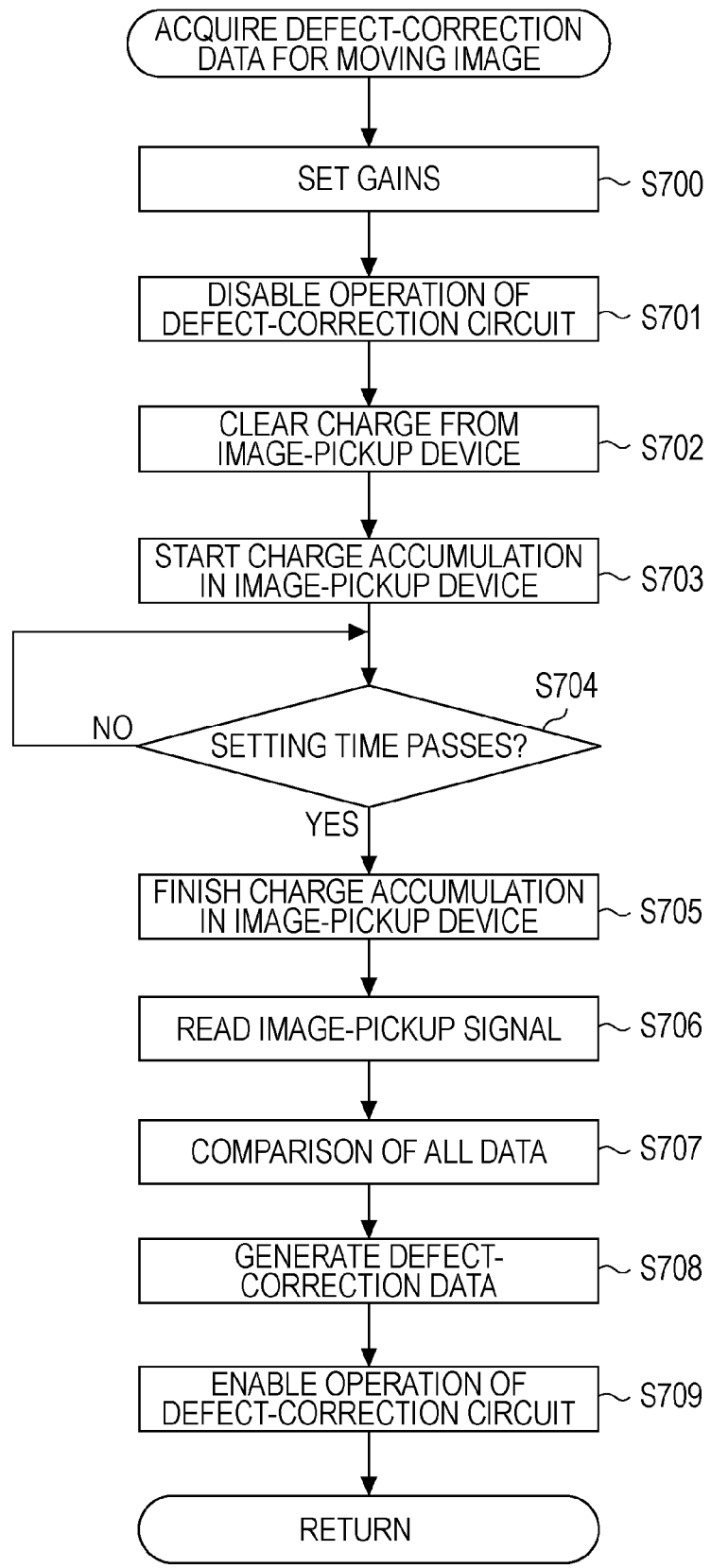
FIG. 7 is a flowchart showing the details of a process of step S601 shown in FIG. 6, in which defect-correction data for a moving image is acquired.

The dark image is read from the image-pickup device 101 in a reading method corresponding to the moving-image shooting mode that has been set in step S600 shown in FIG. 6. In other words, in step S706, dark-image data can be acquired in the same reading method as used when a moving image is to be shot. Because the defect-correction circuit 1033 does not operate, the dark-image data includes the output levels of defective pixels that are as they are without been corrected.

Then, the CPU 105 generates the defect-correction data for shooting a moving image on the basis of the dark-image data. In other words, the CPU 105 sequentially reads the dark-image data that has been acquired for each pixel, and compares levels in the dark-image data with a predetermined determination level (step S707). When the output levels in the dark-image data are higher than the determination level, the CPU 105 detects pixels having the output levels as white-defective pixels. The CPU 105 generates address information concerning the white-defective pixels as defect-correction data in the RAM 107 (step S708). The address information can be described as timing data similar to the above-described timing data.

In this case, as described above, the dark-image data is read using the same reading method as used when a moving image is to be shot. Accordingly, addresses of the defective pixels, which have been detected on the basis of the dark-image data, can be easily converted to the address information, which is used as correction data to be supplied to the defect-correction circuit 1033 included in the DSP 103, by adding an offset (a time corresponding to a horizontal blanking interval) against a synchronization signal to the addresses.

Finally, the CPU 105 enables the operation of the defect-correction circuit 1033 so that a defect-correction process using the defect-correction data that has been generated in step S708 can be implemented (step S709).

Next, the description returns to the flowchart of the moving-image shooting process shown in FIG. 6. When the process in which the defect-correction data for a moving image is acquired is finished in step S601, the CPU 105 performs an operation of moving the mirror (not shown) into the mirror-up position and an operation of opening the shutter (not shown) (step S602). By performing the operations, the object image can enter the image-pickup device 101 all the time.

Then, the CPU 105 determines whether or not the shutter switch SW2 is turned on (step S603). When the shutter switch SW2 is turned on, the CPU 105 starts a recording process in which moving-image data is written into the recording medium 108 (step S605). In contrast, when the shutter switch SW2 is turned off, on the condition that the recording process in which the moving-image data is written into the recording medium 108 is currently being performed, the CPU 105 halts the recording process (step S604). In other words, while the shutter switch SW2 is turned on, the CPU 105 continues the recording process in which the moving-image data is recorded. At a time when the shutter switch SW2 is turned off, the recording process in which the moving-image data is recorded is halted. For safety, even when the shutter switch SW2 is not turned off, at a time when a predetermined time elapses, or at a time when the remaining capacity of the recording medium 108 becomes small, the recording process may be halted.

After performing a process of step S604 or a process of step S605, the CPU 105 performs an exposure adjustment in order to perform the monitor operation of repeating an operation of displaying data on a monitor, i.e., an operation of displaying image data on the LCD 114 (step S606). In the exposure adjustment, an exposure value is determined from image data including the immediately preceding image that has been shot, and the aperture of the image-shooting lens and the gain of a circuit included in the AFE 102 are set so that an appropriate exposure value can be obtained. However, when a first moving image is shot, no immediately preceding data exists. Accordingly, initialization values are set for the aperture of the image-shooting lens and the gain of a circuit included in the AFE 102.

Then, the CPU 105 performs an image-shooting process (step S607). When a moving-image is shot, the image-pickup device 101 repeats a set operations comprising: a charge-clearing process, a charge accumulation, and a reading process on the basis of a driving signal output from the timing-generator circuit 104. Additionally, the image-pickup device 101 is driven in the moving-image shooting mode that has been set and that corresponds to a reading method suitable for the size and position of the moving image, and a reading operation is repeated at a predetermined frame rate.

Next, the CPU 105 controls the DSP 103 so that the defect-correction circuit 1033 included in the DSP 103 can perform a defect-correction process for the defective pixels using the defect-correction data (the address information), which has been acquired in step S601, to correct the moving-image data read in the image-shooting process (step S608) (a second correction process). The defect-correction process is the same process as used for a still image except that defect-correction data used in the defect-correction process for a moving image is different from that used in the defect-correction process for a still image.

Then, the CPU 105 controls the DSP 103 so that the DSP 103 can perform a development process (step S609), and a compression process used for the operation of displaying data on a monitor (step S610). The CPU 105 displays the results of the processes on the LCD 114 (step S611), which is a display operation. The monitor operation can be performed by repeating the display operation at a frame rate that is necessary to display the results.

Figure 2:
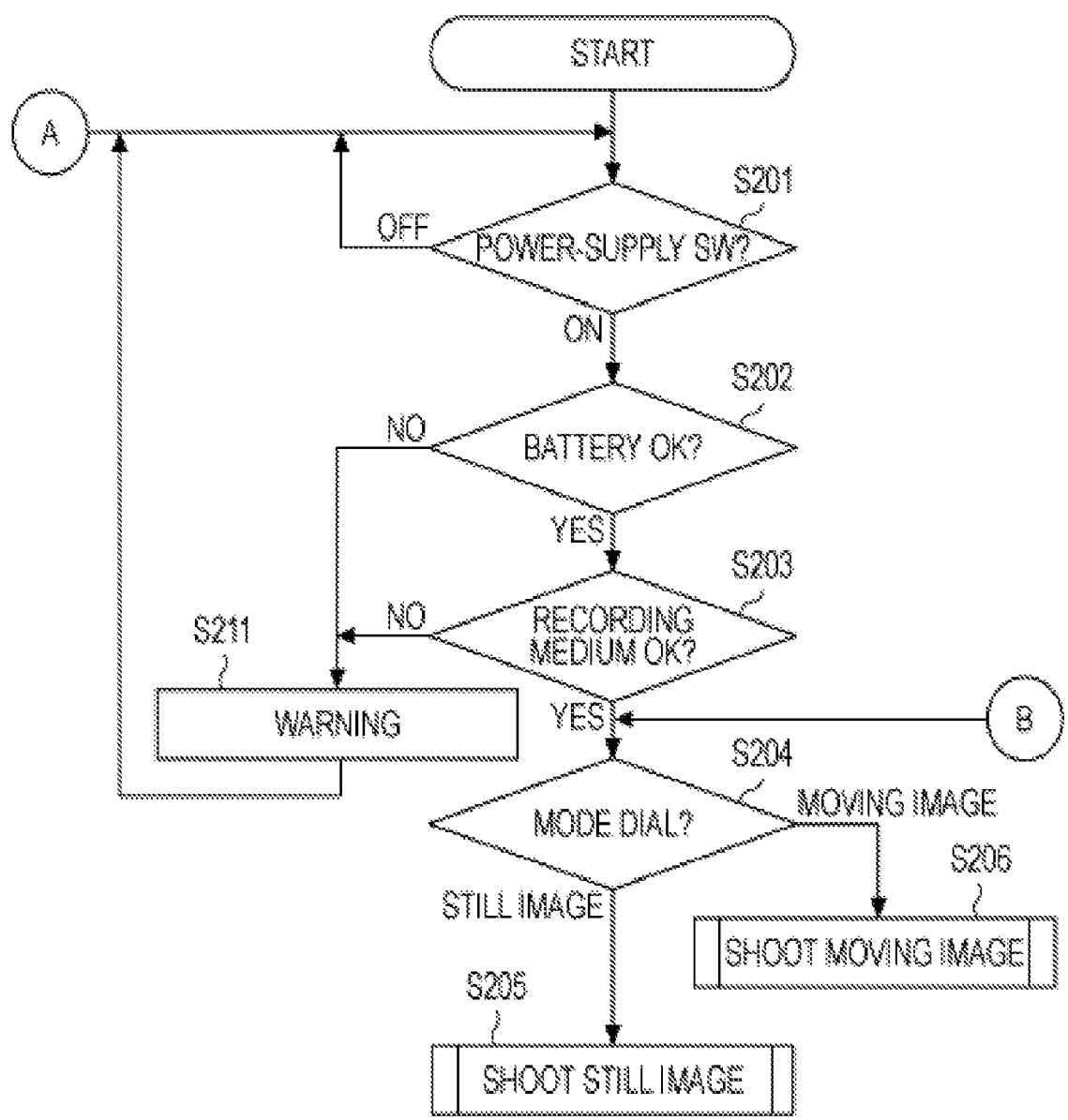
FIG. 2 is a flowchart showing an outline of an image-shooting operation of the image-pickup apparatus.

Next, when the power-supply switch 109 is turned off (step S612), the CPU 105 performs a moving-image termination process (step S614), and returns to step S201 shown in FIG. 2. In contrast, when the power-supply switch 109 is still turned on (step S612), the CPU 105 checks the setting of the mode dial 112 (step S613). When the mode dial 112 is set to be still in the moving-image shooting mode, the CPU 105 returns to step S603. In contrast, the setting of the mode dial 112 is switched to the still-image-shooting mode, the CPU 105 performs the moving-image termination process (step S615), and returns to step S204 shown in FIG. 2.

In the moving-image termination process of step S614 and step S615, when the recording process is currently being performed, the recording process is halted. Additionally, an operation of driving the image-pickup device 101 is halted, and the reading process performed by DSP 103 is halted. Furthermore, the shutter (not shown) is closed, and the mirror (not shown) is moved into the mirror-down position.

As described above, in this embodiment, as the defect-correction data for shooting a still image, data is used, which is acquired when the image-pickup device 101 is shipped from a manufacturing factory of the image-pickup device 101. In contrast, when the image-pickup apparatus operates in a reading mode for a moving image, immediately before a reading operation is performed in the reading mode, the charge accumulation and the reading process are performed in a state in which the image-pickup device 101 is shielded from light to obtain image data. Addresses of defective pixels to be corrected are detected using the obtained image data, and address information concerning the addresses is stored in the RAM 107 as the defect-correction data. When a moving image is shot, the defect-correction process is performed using this defect-correction data in the RAM 107.

In this case, the defect-correction data to be stored in the ROM 106 is only the defect-correction data for still images as in the related art. Accordingly, there is no need to increase the memory size of the ROM 106. In a case in which a moving image is shot, before the moving image is shot, the dark image is shot, and defective pixels are detected in each reading method. Accordingly, there is no need to perform an address-conversion process in which addresses of the defective pixels are converted, which is a complicated arithmetic process.

Furthermore, when an operation test is conducted for a shipment of the image-pickup device 101, only the defect-correction data needs to be acquired in a condition specific to still images. There is no need to acquire a large number of defect-correction data specific to each of various types of reading operations for moving images. Accordingly, the test time of the operation test of the image-pickup device 101 can be reduced, and there is no need to manage a large number of defect-correction data.

In addition, in a manufacturing process of a camera, there is no need to acquire defect-correction data specific to each of various types of reading operations used in the moving-image shooting mode. Accordingly, the test time of an operation test of the camera can be reduced, and there is no need to manage a large number of defect-correction data.

Additionally, in a camera system, there is no need to save defect-correction data specific to each of various types of reading operations used in the moving-image shooting mode in a flash memory or the like. The increase in memory size can be suppressed.

In the camera system, no workload is necessary, in which defect-correction data for each of various types of reading operations used in the moving-image shooting mode is converted from the defect-correction data for still images. Because the load becomes light in activation, a high-speed activation can be performed.

There is no need to design hardware so that the hardware operates at a high speed in order to perform a conversion operation at a high speed. Accordingly, an increase in cost can be avoided.

Also in the camera system, a defective-pixel-detection process is performed for each of various types of reading operations in the moving-image shooting mode used in a case in which a moving image is shot. However, a calculation process in which the defect-correction data for a moving image is obtained can be performed in the same method, not depending on each reading method. Accordingly, even in a case in which the camera system has a large number of reading methods, the increase in load on the development of firmware due to an addition of a defective-pixel-detection function can be suppressed.

The present invention is not limited to the above-described embodiment, and various modifications can be made. For example, in the above-described embodiment, after the dark image is acquired in a reading method for a moving image and the defect-correction data for a moving image is generated in step S601, the monitor operation and the recording operation are performed as described above. Alternatively, if the DSP 103 can deal with processes, a process in which the dark image is acquired in a reading method for a moving image can be performed at the time of step S601, and a generation process in which the defect-correction data for a moving image is generated can be performed later.

In other words, before the defect-correction data for a moving image is generated, the CPU 105 can immediately proceed to the monitor operation and the recording operation. The defect-correction data for a moving image can be generated while the monitor operation and the recording operation are concurrently performed. In this case, a time lag between when an operation of setting a mode using the mode dial 112 is performed and when a moving image is displayed can be reduced.

Alternatively, after the generation process in which the defect-correction data for a moving image is generated has been started, mechanical operations, such as the operation of moving the mirror into the mirror-up position or a shutter operation, can be performed. While the mechanical operations are performed, the defect-correction data for a moving image can be generated.

Furthermore, the defect-correction circuit 1033 replaces the outputs of defective pixels with the outputs of immediately preceding pixels having the same color. However, the defective pixels can be corrected in a correction method other than the above-described method.

The defect-correction data, i.e., information used to specify defective pixels, is not limited to the timing data described above. Address information, such as X and Y coordinate values indicating the physical positions of defective pixels, may be used.

Additionally, in a case in which a still image is shot, a dark image that has been obtained in the image-pickup device 101 may be read, and a level value of a dark current may be determined from the dark image. Image data may be obtained by subtracting the level value of a dark current from image data that is subjected to the defect-correction process in step S415.

The purpose and the method of use of dark-image data that is generated in a case in which a still image is shot are different from those of use of the above-described dark-image data that is generated in a case in which a moving image is shot. As described above, the dark-image data generated for a case in which a moving image is shot is used to detect pixels having level values higher than the determination value as white-defective pixels. In contrast, the dark-image data generated for a case in which a still image is shot is used to subtract each pixel data included in the dark-image data from corresponding pixel data that has already been subjected to the defect-correction process, thereby removing the dark current.

Additionally, in the above-described embodiment, as an example of image data to be subjected to the defect-correction process performed using the dark-image data, moving-image data that is subjected to the thinned-out reading process, the thinned-out pixel-addition reading process, and the partially cut out reading process is described. However, the image data is not limited to the moving-image data. When still-image data that is subjected to the defect-correction process performed using the defect-correction data saved in the ROM 106 contains a certain number of pixels, any image data containing the number of pixels different from the certain number can be provided as image data to be subjected to the defect-correction process performed using the dark-image data. For example, still-image data to be subjected to the thinned-out reading process, the thinned-out pixel-addition reading process, and the partially cut out reading process can be subjected to the defect-correction process performed using the dark-image data.

In another embodiment, a storage medium, in which software capable of realizing functions described in the forgoing embodiments, is provided. In other words, the storage medium is provided in a system or an apparatus, and a computer (or a CPU, a microprocessor unit (MPU), or the like) of the system or the apparatus reads and executes the program code that is stored in the storage medium.

In this case, the program code itself, which is read from the storage medium, can realize the functions described in the forgoing embodiments. Accordingly, the program code and the storage medium in which the program cord is stored can be provided in accordance with the embodiments of the present invention.

Examples of the storage medium, which can provide the program code, include a floppy disk, a hard disk, and a magneto-optical disk. Alternatively, an optical disk, such as a compact disk read-only memory (CD-ROM), a compact disk recordable (CD-R), a compact disk rewritable (CD-RW), a digital-versatile-disk read-only memory (DVD-ROM), a digital-versatile-disk random-access memory (DVD-RAM), a digital-versatile-disk rewritable (DVD-RW), and a digital-versatile-disk rewritable (DVD+RW), a magnetic tape, a non-volatile memory card, and a ROM, and so forth can be used. The program code may be downloaded via a network.

The present invention is not limited to the embodiments in which the computer reads and executes the program code to realize the functions described in the forgoing embodiments. In another embodiment, for example, on the basis of instructions of the program code, an operating system (OS), which operates in the computer, or the like may perform a part of or all of processes to realize the functions described in the forgoing embodiments.

Furthermore, in another embodiment, the program code is read from the storage medium, and then written into a memory mounted on a feature-expansion board, which is inserted in the computer, or a memory included in a feature-expansion unit, which is connected to the computer, whereby the functions described in the forgoing embodiments can be realized. In this case, after the program code is written, on the basis of instructions of the program code, a CPU, which is mounted on the feature-expansion board or included in the feature-expansion unit, or the like may perform a part of or all of processes to realize the functions described in the forgoing embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-145474 filed May 31, 2007 and No. 2008-104750 filed Apr. 14, 2008, which are hereby incorporated by reference herein in their entirety.

What is claimed is:

1. An image processing apparatus comprising:
a storage medium in which first correction data is stored in advance;
a generator circuit arranged to generate second correction data using dark image data that is read from an image-pickup device in which charge accumulation is performed in a state in which the image-pickup device is shielded from light;

a first correction circuit arranged to correct image data associated with a defective pixel of the image-pickup device on the basis of the first correction data;

a second correction circuit arranged to correct image data associated with the defective pixel of the image-pickup device on the basis of the second correction data; and a control circuit operable to control the image-pickup device based on a shooting mode set in the image-pickup device, and to select either the first correction circuit or the second correction circuit for correcting image data associated with the defective pixel of the image-pickup device based on the shooting mode, wherein the control circuit controls the image-pickup device to perform charge accumulation for obtaining a still image after reading out the first correction data from the storage medium, and selects the first correction circuit to correct the image data related to the defective pixel of the image-pickup device by using the first correction data in a case where a still-image-shooting mode is set in the image-pickup device, and wherein the control circuit controls the image-pickup device to perform charge accumulation for obtaining a moving image after obtaining the second correction data generated by the generator circuit, and selects the second correction circuit to correct the image data related to the defective pixel of the image-pickup device by using the second correction data in a case where a moving-image-shooting mode is set in the image-pickup device.

2. The image processing apparatus according to claim 1, wherein the first correction data includes data showing the position of the defective pixel for image data containing a first number of pixels, and wherein, when the number of pixels in the image data read from the image-pickup device is equal to the first number of pixels, the control circuit selects the first correction circuit, and, when the number of pixels in the image data read from the image-pickup device is smaller than the first number of pixels, the control circuit selects the second correction circuit.

3. The image processing apparatus according to claim 1, wherein the control circuit selects the second correction circuit as a correction circuit that corrects image data that is thinned out and read from the image-pickup device.

4. The image processing apparatus according to claim 1, wherein the control circuit selects the second correction circuit as a correction circuit that corrects image data that is partially cut out and read from the image-pickup device.

5. The image processing apparatus according to claim 1, wherein the generator circuit is operable to generate the second correction data using image data containing the same number of pixels as in image data that is to be corrected by the second correction circuit.

6. The image processing apparatus according to claim 1, wherein the second correction data includes information showing the position of a pixel having an output level higher than a predetermined determination value, the output level being shown in the image data that is read from the image-pickup device in which charge accumulation is performed in the state in which the image-pickup device is shielded from light.

7. An image processing apparatus comprising:
a storage medium in which first correction data is stored in advance;
a generator circuit arranged to generate second correction data using dark image data that is read from an image-pickup device in which charge accumulation is performed in a state in which the image-pickup device is shielded from light;

a first correction circuit arranged to correct image data associated with a defective pixel of the image-pickup device on the basis of the first correction data;

a second correction circuit arranged to correct image data associated with a defective pixel of the image-pickup device on the basis of the second correction data; and a control circuit arranged to select the first correction circuit or the second correction circuit for correcting image data associated with the defective pixel of the image-pickup device on the basis of whether image data read from the image-pickup device corresponds to a moving image or a still image, wherein the control circuit, after reading out the first correction data from the storage medium, selects the first correction circuit to correct the image data related to the defective pixel of the image-pickup device by using the first correction data in a case where the image data read from the image-pickup device corresponds to the still image, and wherein the control circuit, after obtaining the second correction data generated by the generator circuit, selects the second correction circuit to correct the image data related to the defective pixel of the image-pickup device by using the second correction data in a case where the image data read from the image-pickup device corresponds to the moving image.

8. The image processing apparatus according to claim 7, wherein the first correction data includes data showing the position of the defective pixel for image data including a still image, and wherein, when the image data read from the image-pickup device includes a still image, the control circuit selects the first correction circuit, and, when the image data read from the image-pickup device includes a moving image, the control circuit selects the second correction circuit.

9. An image processing method for correcting image data associated with a defective pixel of an image-pickup device, the image processing method comprising:
determining the number of pixels in the image data read from the image-pickup device;
selecting either a first defective pixel correcting step using first correction data or a second defective pixel correcting step using second correction data, based on the number of pixels in the image data read from the image-pickup device, the first correction data having been stored in advance and the second correction data being derived from image data that is read from the image-pickup device in which charge accumulation is performed in a state in which the image-pickup device is shielded from light; and
carrying out the selected defective pixel correcting step so as to correct the image data associated with a defective pixel of an image-pickup device, wherein the selecting step selects the first defective pixel correcting step to correct the image data related to the defective pixel of the image-pickup device by using the first correction data in a case where a still-image-shooting mode is set in the image-pickup device, and wherein the selecting step selects the second defective pixel correcting step to correct the image data related to the defective pixel of the image-pickup device by using the second correction data in a case where a moving-image-shooting mode is set in the image-pickup device.

10. The image processing method according to claim 9,
wherein the first correction data includes data showing the position of the defective pixel for image data containing a first number of pixels, and
wherein, in the selecting step, when the number of pixels in the image data read from the image-pickup device is equal to the first number of pixels, the first correction data is used, and, when the number of pixels in the image data read from the image-pickup device is smaller than the first number of pixels, the second correction data is used.

11. An image processing method for correcting image data associated with a defective pixel of an image-pickup device, the image processing method comprising:
determining whether image data read from the image-pickup device relates to a moving image or a still image;
selecting either a first defective pixel correction step using first correction data stored in advance or a second defective pixel correcting step using second correction data generated using image data that is read from the image-pickup device in which charge accumulation is performed in a state in which the image-pickup device is shielded from light; and
carrying out the selected defective pixel correcting step so as to correct image data associated with a defective pixel of the image-pickup device,
wherein the selecting step selects the first defective pixel correcting step to correct the image data related to the defective pixel of the image-pickup device by using the first correction data in a case where the image data read from the image-pickup device corresponds to the still image, and
wherein the selecting step selects the second defective pixel correcting step to correct the image data related to the defective pixel of the image-pickup device by using the second correction data in a case where the image data read from the image-pickup device corresponds to the moving image.

12. The image processing method according to claim 11,
wherein the first correction data includes data showing the position of the defective pixel for image data including a still image, and
wherein, in the selecting step, if the image data read from the image-pickup device relates to a still image, the first correction data is selected, and, if the image data read from the image-pickup device relates to a moving image, the second correction data is selected.

\* \* \* \* \*